Feb. 10, 1925.
N. T. ALBRIGHT
WINDSHIELD WING CLAMP
Filed Oct. 15, 1923
1,526,037
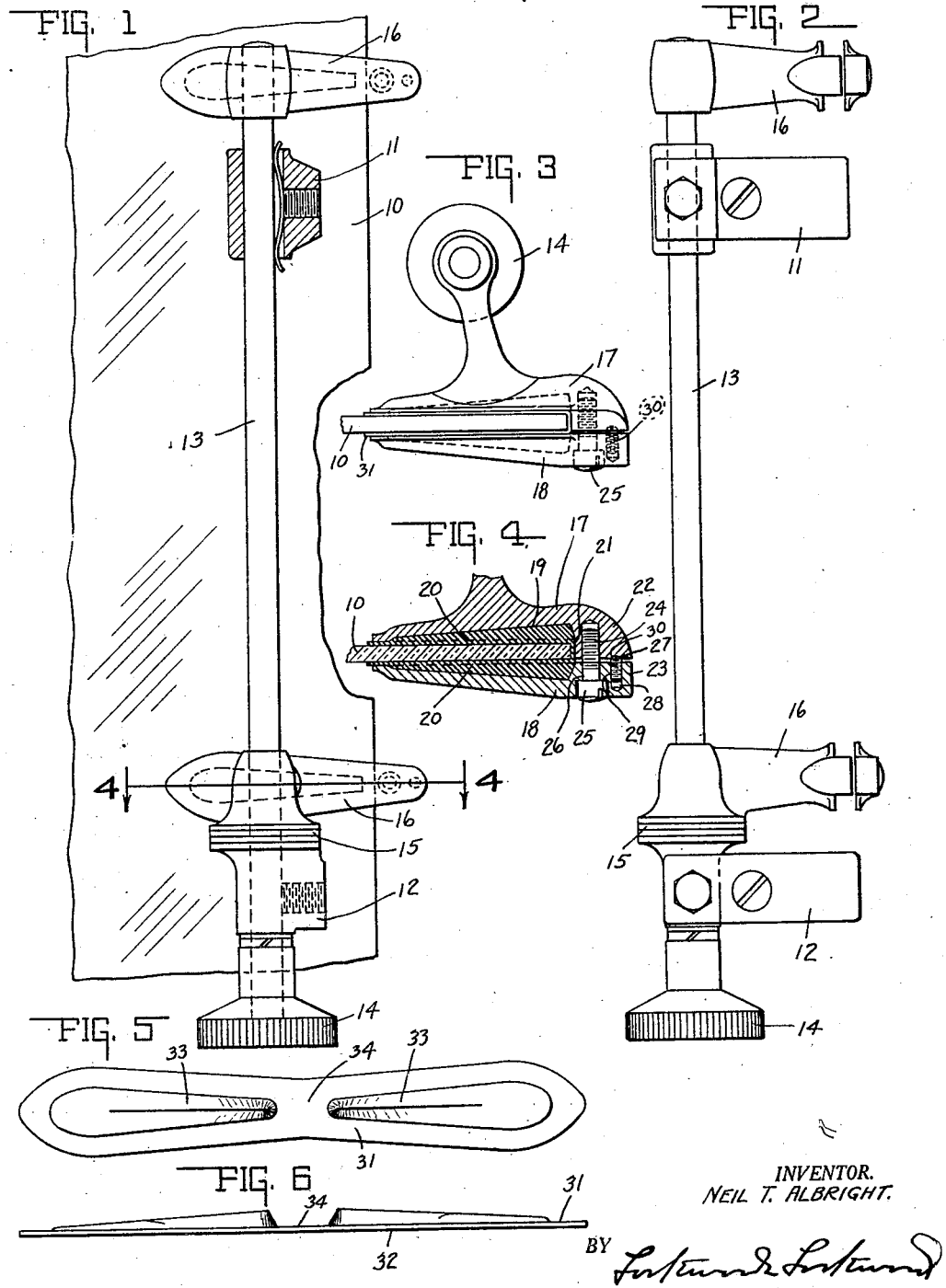
INVENTOR.
NEIL T. ALBRIGHT.
BY
ATTORNEYS.

Patented Feb. 10, 1925.

1,526,037

UNITED STATES PATENT OFFICE.

NEIL T. ALBRIGHT, OF KOKOMO, INDIANA, ASSIGNOR TO KOKOMO AUTOMOTIVE MFG. CO., OF KOKOMO, INDIANA, A CORPORATION.

WINDSHIELD WING CLAMP.

Application filed October 15, 1923. Serial No. 668,623.

*To all whom it may concern:*

Be it known that I, NEIL T. ALBRIGHT, a citizen of the United States, and a resident of Kokomo, county of Howard, and State of Indiana, have invented a certain new and useful Windshield Wing Clamp; and I do hereby declare that the following is a full, clear, and exact description thereof, reference being had to the accompanying drawings, in which like numerals refer to like parts.

This invention relates to improvements in mountings for windshield wings and the like.

One object of the invention is to provide a clamp for supporting a wing or the like, the component parts of which are secured in spaced relation by a relatively concealed construction.

Another object of the invention is to construct the clamp for a wing or the like and provide an elongated integral cushion or yieldable member for engaging opposite sides of the wing to be clamped and enveloping the edge thereof, which clamp and cushion have cooperative surfaces for anchoring one to the other.

One of the chief features of the invention consists in constructing a clamp for a windshield wing or the like of a pair of clamping members secured together in clamping relation and limited with respect thereto by a concealed spacing construction which consists of a pair of recesses in substantial alignment with each other, one recess adjustably supporting a spacing member having a tool-engageable portion in the opposite and aligned recess.

Another feature of the invention consists in forming the cushion for engaging opposite sides of the member to be clamped (the windshield wing or the like) and enveloping the edge as an elongated strip provided with a surface adapted to cooperate with a corresponding surface upon the clamping member, whereby said elongated strip will be anchored to the clamping member when in clamping relation.

Another feature of the invention consists in the association of these two features whereby an improved clamping construction is secured.

The full nature of the invention will be understood from the accompanying drawings and the following description and claims:

In the drawings, Fig. 1 is a side elevational view of a portion of a windshield wing, a support therefor and the clamp construction associating said support and said windshield wing together and including the invention. Fig. 2 is an end elevational view of the windshield wing, support and the clamp including the invention. Fig. 3 is a top plan view of the clamp and support shown in Figs. 1 and 2. Fig. 4 is a transverse sectional view through the parts shown in Fig. 3. Fig. 5 is a plan view of the resilient cushion member. Fig. 6 is an elevational view of the same.

In the drawings 10 indicates a member to be clamped, herein illustrated as a windshield wing in the form of sheet glass. Herein 11 and 12 indicate clamping members adapted to be associated with a portion of the vehicle for supporting the support herein shown in the form of a rod 13. A locking construction 14 and 15 associates the same together. The foregoing constitutes no part of the present invention.

Suitably supported upon the rod or support 13 is a pair of clamps, substantially similar; and in Figs. 1 and 2 these clamps are indicated generally by the numeral 16.

Reference will now be had to Figs. 3 and 4, wherein the detailed construction of the improved clamp is illustrated in detail. In Fig. 1 it will be noted that the clamping members have an outline resembling that of an arrow head; and said clamping members, herein indicated in Figs. 3 and 4 by the numerals 17 and 18, are each shown provided with a recess 19 in the adjacent faces thereof. The members 17 and 18 are complementary, and provide, in addition to the clamping faces 20, a lateral supporting face 21. The clamping members 17 and 18 are extended as at 22 and 23 respectively, and herein the member 17 is shown provided with a threaded opening 24 adapted to receive a threaded bolt 25 having a tool-engageable head and passable through a suitable and complementarily formed opening 26 in the member 18.

Herein the extension 22 is shown provided with a recess 27, which recess opens upon the face adjacent the other clamping member and does not extend through said extension 22. A similar recess 28 is formed in the opposite extension 23, and herein one of said recesses is shown threaded. A spacing member 29 having a tool-engageable portion 30 is seatable in one of said recesses with its tool-engageable head seatable in the other recess. Herein said spacing member 29 has a threaded connection with the threaded recess 28, and the tool-engageable head 30 of said spacing member 29 is shown seated in the other recess 27 for maintaining the clamping members 17 and 18 in spaced relation. From the foregoing it will be noted that the recesses 27 and 28 do not extend through the extensions 22 and 23, and, therefore, a concealed construction results therefrom. This reduces the possibility of breakage of the windshield wing to a considerable degree, since the aforesaid spacing adjustment is made at the factory, and unless the entire construction be dismantled, said adjustment cannot be changed readily by the user of the article. In this way it will be impossible for the user of the article to secure such a relationship between the clamping members that breaking of the windshield wing will be certain to result from tightening the clamping bolt 25. The clamping bolt 25, therefore, can be tightened or loosened as desired to rigidly secure the windshield wing in position upon the support 13, but the aforesaid concealed spacing construction reduces and substantially eliminates accidental breakage from excessive clamping action.

Reference will now be had to Figs. 3 to 6 inclusive, wherein there is illustrated the means for cushioning the fragile windshield wing in the clamp. Herein, as previously described, the arrow headed clamping members 17 and 18 of the clamp are provided with the adjacent clamping faces 20, and the adjacent recesses 19 as well as a transverse supporting face 21. Interposed between said clamps and the member to be clamped (windshield wing 10) is a resilient cushion or yieldable member, preferably of flexible rubber, although other suitable material may be utilized.

Reference will now be had to Figs. 5 and 6. In these figures the cushion is illustrated in detail. Said cushion comprises an elongated strip 31 having a flat face 32 and a ridged back. The back preferably is ridged by wedge-shaped ridges 33 separated from each other at the median portion of the elongated strip. Herein each ridge is shown with its greatest height along the longitudinal center line of the strip, and said height from the median of said strip to the end thereof progressively decreases. Also said ridge 33 from the median portion of the strip to the free end thereof progressively increases in width. The aforesaid ridge 33 is seatable in the complementarily formed recess 19 of the clamping member. The clamping surface 20 of the clamping member bears upon the strip and particularly the flat portion thereof, and forces said cushion strip into engagement with the member to be clamped. The intermediate portion 34 between the ridges 33 envelopes the end of the member to be clamped and is interposed between the supporting face 21 of said clamp and the member to be clamped. By the aforesaid, the member to be clamped is rigidly secured in the clamp by the frictional engagement between it and the enveloping cushion strip and said cushion strip is anchored to the clamp by complementary surfaces upon said clamp and said strip, which prevents accidental removal of said strip through vibration or otherwise.

The invention claimed is:

1. In combination, a clamp including a pair of clamping members adapted to engage upon the opposite faces of a member to be clamped, each of said members having a longitudinally disposed recess in its clamping face varying in depth from end to end, a cushion member to be positioned upon the clamping faces of said members, and a projection on the back of said cushion member corresponding in size and shape with said recesses and adapted to snugly fit and engage therein.

2. In combination, a pair of clamping members adapted to embrace the opposite faces of a member to be clamped, the clamping face of each of said members having a longitudinally disposed recess therein increasing in depth from the inner to the outer end thereof and having converging side walls for a part of its length, a cushion member to be bent upon itself with its end portions resting upon said clamping faces, and ridge members on the backs of said end portions corresponding in size and shape with said recesses and adapted to snugly engage within the same.

In witness whereof, I have hereunto affixed by signature.

NEIL T. ALBRIGHT.